No. 749,859. PATENTED JAN. 19, 1904.
T. HALEY.
VALVE FOR AIR BRAKES.
APPLICATION FILED AUG. 5, 1903.
NO MODEL.

Attest:
J. C. Middleton
Walter Donaldson

Inventor
Timothy Haley.
by F. L. Middleton
Atty

THE NORRIS PETERS CO., PHOTO-LITHO., WASHINGTON, D. C.

No. 749,859.  
Patented January 19, 1904.

UNITED STATES PATENT OFFICE.

TIMOTHY HALEY, OF XENIA, OHIO.

VALVE FOR AIR-BRAKES.

SPECIFICATION forming part of Letters Patent No. 749,859, dated January 19, 1904.

Application filed August 5, 1903. Serial No. 168,386. (No model.)

*To all whom it may concern:*

Be it known that I, TIMOTHY HALEY, a citizen of the United States, residing at Xenia, in the county of Greene and State of Ohio, have invented a new and useful Improvement in Valves for Air-Brakes, of which the following is a full and complete description.

My invention relates to that portion of the brake lying between the release part and the auxiliary reservoir and has special application and adaptation to brakes on railroad-cars.

The object of my device is to provide a means whereby the pressure may be held and applied upon the brake until the air in the auxiliary reservoir will gain that pressure which it lost by reason of the application of the brakes and the removal of the air from the reservoir for that purpose. To accomplish this object, I employ a double valve which is by means of pipe connections placed between the release part of the brake and the auxiliary reservoir, into which the air is pumped.

My device consists of a solid piece of steel having cylinders tooled out at both its ends and a small cylinder then extending through the center. In the middle of said cylinder I arrange two ports for the escape of the air. Within the small cylinder 6 I use a double valve having heads at each of its ends and upon which heads the pressure is exerted.

To give a more complete description of my device, I refer to my drawings hereto annexed and made a part of the specification herein.

Figure 1:
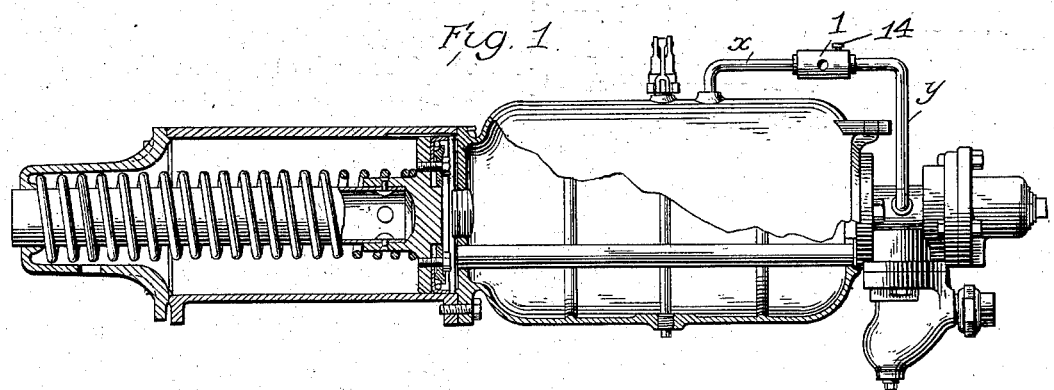
Figure 4:
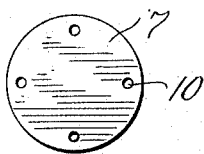
Figure 2:
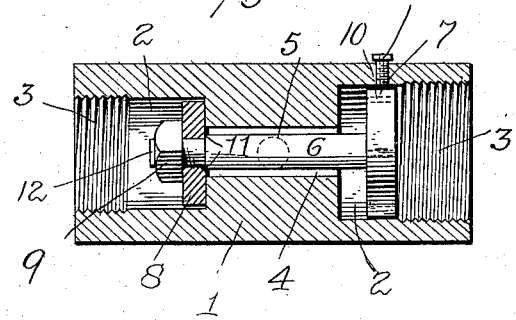
Figure 3:
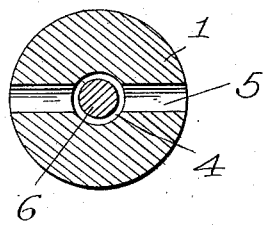

Figure 1 shows a half-section of my device, and Fig. 2 shows the valve-heads and their shaft. Fig. 3 is a transverse sectional view of Fig. 2 at the air escape-ports. Fig. 4 is a face view of one of the heads of the valve.

In Fig. 1 numeral 1 is a piece of steel having cylinders 3 bored out at each of its ends and the ends of these cylinders being threaded, as is shown, for pipe connections, but leaving a portion of the cylinder on the inside smooth, this being indicated by 2. 4 is the small cylinder, and 5 is the escape-ports for the air. Within the smaller cylinder 4 is a valve-rod 6, having at each of its ends the valve-heads 7 and 8. In order to hold the valve-head 8 in place, a nut 9 is employed and is fastened upon the thread end 12, the rod 6 being cut so that the head 8 fits against the shoulder 11. In the valve-head 7 are holes 10, which permit the air to escape when the head 7 seats itself.

As I have formerly indicated, my device is placed by pipe connection between the auxiliary reservoir and the release part of the brake and the one end of my device having pipe connection with the air-reservoir and the other with the release part, and when the air is applied upon the brake-cylinder and taken from the reservoir the pressure is reduced and the air escaping after the release goes into the release-pipe, which leads into the one end of my device and against the head 7 of the valve. The valve is then forced in and the head 7 seats itself. Thus the pressure is maintained for the application of the brakes again, if necessary, while the air is being pumped to the required pressure in the auxiliary reservoir. When the air reaches the required pressure in the reservoir, the pressure is exerted upon the head 8 of the valve, there being pipe connections between my device and the reservoir and the pressure being sufficient forces the head 8 in and causes it to seat itself, thereby releasing 10, as it is shown in the figure, and the air from the release-pipe escaping through the ports 10 and small cylinder and ports 5. Heretofore to accomplish this purpose it has been necessary to employ the use of a long pipe extending to the top of the car and having a weight placed on top on the inside and a release-valve being used to raise the weight and allow the air to escape when required to take the pressure off of the brake.

My device works automatically, and in case of an emergency stop or application of the brake I have placed at the one end of the cylinder in which the head 7 is located a valve 14, which will allow the air to escape if a certain pressure is reached.

Having described my invention, what I claim is—

1. In combination with the auxiliary reservoir, a valve-casing connected at one end with the said reservoir and connected at the other end with the release part, said casing having an outlet for the escape of air, and a double-headed valve arranged in the said casing and subjected to the pressure from the release part and the auxiliary reservoir, substantially as described.

2. In combination with the auxiliary reservoir and the release part of the brake, a valve-casing, a double-headed valve arranged therein, said casing having an escape-port between the valve-heads, one of the valve-heads having perforations, and pipe connections leading from the valve-casing to the auxiliary reservoir and release part, substantially as described.

3. A device for retaining the pressure on a brake, consisting of a double-headed valve both having a common rod connection and said valves and rod working within a cylinder suited to the same, and escape-ports to permit the air to escape from the cylinder.

In witness whereof I have hereunto set my hand at Xenia, Ohio, this 23d day of January, 1903.

TIMOTHY HALEY.

Witnesses:
W. L. MILLER,
LIZZIE MILLER.